United States Patent
Zucker et al.

(10) Patent No.: US 8,446,607 B2
(45) Date of Patent: May 21, 2013

(54) METHOD AND SYSTEM FOR POLICY BASED MONITORING AND BLOCKING OF PRINTING ACTIVITIES ON LOCAL AND NETWORK PRINTERS

(75) Inventors: Elad Zucker, St. Netanya (IL); Eran Werner, Raanana (IL)

(73) Assignee: McAfee, Inc., Santa Clara, CA (US)

( * ) Notice: Subject to any disclaimer, the term of this patent is extended or adjusted under 35 U.S.C. 154(b) by 1208 days.

(21) Appl. No.: 11/905,420

(22) Filed: Oct. 1, 2007

(65) Prior Publication Data

US 2009/0086252 A1    Apr. 2, 2009

(51) Int. Cl.
*G06K 15/00*    (2006.01)

(52) U.S. Cl.
USPC ....... 358/1.14; 358/1.11; 358/1.13; 358/1.15; 358/1.16; 358/2.1; 719/327; 726/1; 726/6; 726/18

(58) Field of Classification Search ............... None
See application file for complete search history.

(56) References Cited

U.S. PATENT DOCUMENTS

| | | | |
|---|---|---|---|
| 5,280,527 A | 1/1994 | Gullman et al. | |
| 5,572,694 A | 11/1996 | Uchino | |
| 5,796,948 A | 8/1998 | Cohen | |
| 5,845,068 A | 12/1998 | Winiger | |
| 5,941,915 A | 8/1999 | Federle et al. | |
| 5,987,610 A | 11/1999 | Franczek et al. | |
| 6,073,142 A | 6/2000 | Geiger et al. | |
| 6,460,050 B1 | 10/2002 | Pace et al. | |
| 6,718,367 B1 | 4/2004 | Ayyadurai | |
| 6,741,851 B1 | 5/2004 | Lee et al. | |
| 6,934,857 B1 * | 8/2005 | Bartleson et al. | 726/5 |
| 6,961,765 B2 | 11/2005 | Terry | |
| 7,023,816 B2 | 4/2006 | Couillard | |
| 7,100,123 B1 * | 8/2006 | Todd et al. | 715/862 |
| 7,124,197 B2 | 10/2006 | Ocepek et al. | |
| 7,149,778 B1 | 12/2006 | Patel et al. | |
| 7,194,728 B1 | 3/2007 | Sirota et al. | |
| 7,313,615 B2 | 12/2007 | Fitzpatrick et al. | |
| 7,475,420 B1 | 1/2009 | Hernacki | |
| 7,484,247 B2 | 1/2009 | Rozman et al. | |
| 7,490,355 B2 | 2/2009 | Wong | |
| 7,506,155 B1 | 3/2009 | Stewart et al. | |

(Continued)

FOREIGN PATENT DOCUMENTS

GB    2411330    8/2005
WO    WO 2006/076536    7/2006

OTHER PUBLICATIONS

Fumera, G. et al., "Spam Filtering Based on the Analysis of Text Information Embedded into Images," Journal of Machine Learning Research, Dec. 2006.

(Continued)

*Primary Examiner* — Miya J Cato
(74) *Attorney, Agent, or Firm* — Patent Capital Group (57) ABSTRACT

A method and system for data loss prevention controls and protects sensitive data from being printed in an unauthorized manner. A method for controlling printing activities implemented in a computer system comprises intercepting a print job comprising print data intended for a printer driver, delaying performance of the print job, analyzing content of the print data to determine whether to allow or cancel the print job based on a security policy, and resuming or canceling the print job based on the analysis of the content of the print data.

16 Claims, 6 Drawing Sheets

U.S. PATENT DOCUMENTS

| | | | |
|---|---|---|---|
| 7,519,984 B2 | 4/2009 | Bhogal et al. | |
| 7,539,857 B2 | 5/2009 | Bartlett et al. | |
| 7,559,080 B2 | 7/2009 | Bhargavan et al. | |
| 7,581,004 B2 | 8/2009 | Jakobson | |
| 7,630,986 B1 | 12/2009 | Herz et al. | |
| 7,653,811 B2 | 1/2010 | Yagiura | |
| 7,661,124 B2 | 2/2010 | Ramanathan et al. | |
| 7,742,406 B1 | 6/2010 | Muppala | |
| 7,890,587 B1 | 2/2011 | Chebiyyam | |
| 8,103,727 B2 | 1/2012 | Lin | |
| 8,111,413 B2 * | 2/2012 | Nuggehalli et al. | 358/1.14 |
| 8,181,036 B1 | 5/2012 | Nachenberg | |
| 8,199,965 B1 | 6/2012 | Basavapatna et al. | |
| 8,272,058 B2 * | 9/2012 | Brennan | 726/24 |
| 2001/0046069 A1 | 11/2001 | Jones | |
| 2002/0046275 A1 | 4/2002 | Crosbie et al. | |
| 2002/0083003 A1 | 6/2002 | Halliday et al. | |
| 2002/0099944 A1 | 7/2002 | Bowlin | |
| 2002/0157089 A1 | 10/2002 | Patel et al. | |
| 2003/0046679 A1 | 3/2003 | Singleton | |
| 2003/0065937 A1 | 4/2003 | Watanabe et al. | |
| 2003/0097583 A1 | 5/2003 | Lacan et al. | |
| 2003/0105979 A1 | 6/2003 | Itoh et al. | |
| 2003/0133443 A1 | 7/2003 | Klinker et al. | |
| 2003/0135744 A1 | 7/2003 | Almeida | |
| 2003/0177394 A1 | 9/2003 | Dozortsev | |
| 2003/0182435 A1 | 9/2003 | Redlich et al. | |
| 2003/0192033 A1 | 10/2003 | Gartside et al. | |
| 2003/0233421 A1 | 12/2003 | Shibata et al. | |
| 2004/0003255 A1 | 1/2004 | Apvrille et al. | |
| 2004/0006715 A1 | 1/2004 | Skrepetos | |
| 2004/0027601 A1 | 2/2004 | Ito et al. | |
| 2004/0034794 A1 | 2/2004 | Mayer et al. | |
| 2004/0054928 A1 | 3/2004 | Hall | |
| 2004/0064732 A1 | 4/2004 | Hall | |
| 2004/0088433 A1 | 5/2004 | Kaler et al. | |
| 2004/0111482 A1 | 6/2004 | Bourges-Waldegg et al. | |
| 2004/0117802 A1 | 6/2004 | Green | |
| 2004/0146006 A1 | 7/2004 | Jackson | |
| 2004/0172557 A1 | 9/2004 | Nakae et al. | |
| 2004/0199555 A1 | 10/2004 | Krachman | |
| 2004/0199596 A1 | 10/2004 | Nutkis | |
| 2004/0230572 A1 | 11/2004 | Omigui | |
| 2004/0255138 A1 | 12/2004 | Nakae | |
| 2005/0033810 A1 | 2/2005 | Malcolm | |
| 2005/0038853 A1 | 2/2005 | Blanc et al. | |
| 2005/0044359 A1 | 2/2005 | Eriksson et al. | |
| 2005/0060643 A1 | 3/2005 | Glass et al. | |
| 2005/0131990 A1 | 6/2005 | Jewell | |
| 2005/0132184 A1 | 6/2005 | Palliyil et al. | |
| 2005/0166066 A1 | 7/2005 | Ahuja et al. | |
| 2005/0172140 A1 | 8/2005 | Ide | |
| 2005/0198285 A1 | 9/2005 | Petit | |
| 2005/0204009 A1 | 9/2005 | Hazarika et al. | |
| 2005/0216749 A1 | 9/2005 | Brent | |
| 2005/0262208 A1 | 11/2005 | Haviv et al. | |
| 2005/0275861 A1 * | 12/2005 | Ferlitsch | 358/1.13 |
| 2006/0005244 A1 | 1/2006 | Garbow et al. | |
| 2006/0010209 A1 | 1/2006 | Hodgson | |
| 2006/0010217 A1 | 1/2006 | Sood | |
| 2006/0021043 A1 | 1/2006 | Kaneko et al. | |
| 2006/0026593 A1 | 2/2006 | Canning et al. | |
| 2006/0041930 A1 * | 2/2006 | Hafeman et al. | 726/2 |
| 2006/0050879 A1 * | 3/2006 | Iizuka | 380/51 |
| 2006/0059548 A1 | 3/2006 | Hildre et al. | |
| 2006/0070089 A1 * | 3/2006 | Shoaib et al. | 719/321 |
| 2006/0075040 A1 | 4/2006 | Chmaytelli | |
| 2006/0075502 A1 | 4/2006 | Edwards | |
| 2006/0112166 A1 | 5/2006 | Pettigrew et al. | |
| 2006/0120526 A1 | 6/2006 | Boucher et al. | |
| 2006/0123413 A1 | 6/2006 | Collet et al. | |
| 2006/0123479 A1 | 6/2006 | Kumar et al. | |
| 2006/0132824 A1 * | 6/2006 | Aritomi | 358/1.14 |
| 2006/0168026 A1 | 7/2006 | Keohane et al. | |
| 2006/0190986 A1 * | 8/2006 | Mont et al. | 726/1 |
| 2006/0224589 A1 | 10/2006 | Rowney et al. | |
| 2006/0248252 A1 | 11/2006 | Kharwa | |
| 2007/0022285 A1 | 1/2007 | Groth et al. | |
| 2007/0033283 A1 | 2/2007 | Brown | |
| 2007/0064883 A1 | 3/2007 | Rosenthal et al. | |
| 2007/0094394 A1 | 4/2007 | Singh et al. | |
| 2007/0118904 A1 | 5/2007 | Goodman et al. | |
| 2007/0143472 A1 | 6/2007 | Clark et al. | |
| 2007/0143851 A1 | 6/2007 | Nicodemus et al. | |
| 2007/0198656 A1 | 8/2007 | Mazzaferri et al. | |
| 2007/0214220 A1 | 9/2007 | Alsop et al. | |
| 2007/0220319 A1 | 9/2007 | Desai et al. | |
| 2007/0279668 A1 * | 12/2007 | Czyszczewski et al. | 358/1.14 |
| 2007/0280112 A1 | 12/2007 | Zheng et al. | |
| 2008/0034224 A1 | 2/2008 | Ferren et al. | |
| 2008/0040358 A1 | 2/2008 | Deng | |
| 2008/0065903 A1 | 3/2008 | Goodman et al. | |
| 2008/0079730 A1 * | 4/2008 | Zhang et al. | 345/468 |
| 2008/0083037 A1 | 4/2008 | Kruse et al. | |
| 2008/0120689 A1 | 5/2008 | Morris et al. | |
| 2008/0170785 A1 * | 7/2008 | Simmons et al. | 382/176 |
| 2008/0208988 A1 | 8/2008 | Khouri et al. | |
| 2008/0229428 A1 | 9/2008 | Camiel | |
| 2008/0309967 A1 * | 12/2008 | Ferlitsch et al. | 358/1.15 |
| 2009/0055536 A1 | 2/2009 | Jo | |
| 2009/0172786 A1 | 7/2009 | Backa | |
| 2009/0182931 A1 | 7/2009 | Gill et al. | |
| 2009/0232300 A1 | 9/2009 | Zucker et al. | |
| 2010/0174784 A1 | 7/2010 | Levey et al. | |
| 2012/0183174 A1 | 7/2012 | Basavapatna et al. | |
| 2012/0191792 A1 | 7/2012 | Chebiyyam | |

OTHER PUBLICATIONS

ClearContext, www.clearcontext.com/user_guide/; [available online at URL <http://web.archive.org/20061107135010/http://www.clearcontext.com/user_guide/>], Nov. 7, 2006 (pp. 1-24).

Dabbish, et al., "Understanding Email Use: Predicting Action on a Message," CHI 2005—Papers: Email and Security, Portland Oregon; available online at URL: <http://www.cs.cmu.edu/~kraut/Rkraut.site.files/articles/dabbish05-UnderstandingEmailUse.pdf> Apr. 2-7, 2005 (pp. 691-700).

U.S. Appl. No. 11/349,479, filed Feb. 6, 2006.

Non-Final Rejection in U.S. Appl. No. 11/349,479 mailed on Dec. 8, 2008.

Response to Non-Final Action dated Dec. 8, 2008 in U.S. Appl. No. 11/349,479, filed Mar. 9, 2009.

Final Rejection in U.S. Appl. No. 11/349,479 mailed on Jun. 10, 2009.

Notice of Appeal in U.S. Appl. No. 11/349,479, filed Dec. 10, 2009.

Appeal Brief filed in U.S. Appl. No. 11/349,479, filed Dec. 10, 2009.

Examiner Interview Summary in U.S. Appl. No. 11/349,479 mailed on Feb. 5, 2010.

Non-Final Rejection in U.S. Appl. No. 11/349,479 mailed on Mar. 22, 2010.

Response to Non-Final Action dated Mar. 22, 2010 in U.S. Appl. No. 11/349,479, filed Jul. 22, 2010.

Notice of Allowance in U.S. Appl. No. 11/349,479 mailed on Nov. 8, 2010.

U.S. Appl. No. 11/473,930, filed Jun. 23, 2006.

Non-Final Office Action in U.S. Appl. No. 11/473,930 mailed on Aug. 17, 2009.

Response to Non-Final Office Action dated Aug. 17, 2009 in U.S. Appl. No. 11/473,930, filed Nov. 17, 2009.

Non-Final Office Action in U.S. Appl. No. 11/473,930 mailed on Jan. 26, 2010.

Response to Non-Final Office Action dated Jan. 26, 2010 in U.S. Appl. No. 11/473,930, filed Apr. 26, 2010.

Non-Final Office Action in U.S. Appl. No. 11/473,930 mailed on Jul. 16, 2010.

Response to Non-Final Office Action dated Jul. 16, 2010 in U.S. Appl. No. 11/473,930, filed Dec. 16, 2010.

Non-Final Office Action in U.S. Appl. No. 11/473,930 mailed on Mar. 10, 2011.

Response to Non-Final Action dated Mar. 10, 2011 in U.S. Appl. No. 11/473,930, filed Jun. 10, 2011.

U.S. Appl. No. 11/546,745, filed Nov. 29, 2006.

Non-Final Office Action in U.S. Appl. No. 11/546,745 mailed Nov. 2, 2009.
Response to Non-Final Office Action mailed on Nov. 2, 2009 U.S. Appl. No. 11/546,745, filed Feb. 2, 2010.
Non-Final Office Action in U.S. Appl. No. 11/546,745 mailed on Apr. 21, 2010.
Response to Non-Final Office Action mailed on Apr. 21, 2010 in U.S. Appl. No. 11/546,745, filed Jul. 21, 2010.
Final Office Action in U.S. Appl. No. 11/546,745 mailed on Oct. 21, 2010.
Request for Continued Examination and Amendment in U.S. Appl. No. 11/546,745, filed Feb. 22, 2011.
U.S. Appl. No. 11/740,844, filed Apr. 26, 2007.
Non-Final Office Action in U.S. Appl. No. 11/740,844 mailed on May 14, 2009.
Response to Non-Final Office Action dated May 14, 2009 in U.S. Appl. No. 11/740,844, filed Oct. 14, 2009.
Final Office Action in U.S. Appl. No. 11/740,844 mailed on Jan. 11, 2010.
Response to Final Office Action dated Jan. 11, 2010 in U.S. Appl. No. 11/740,844, filed Mar. 11, 2010.
Advisory Action in U.S. Appl. No. 11/740,844 mailed on Mar. 25, 2010.
Request for Continued Examination and Amendment filed in U.S. Appl. No. 11/740,844, filed Mar. 29, 2010.
Non-Final Office Action in U.S. Appl. No. 11/740,844 mailed on Jun. 24, 2010.
Response to Non-Final Office Action dated Jun. 24, 2010 in U.S. Appl. No. 11/740,844, filed Nov. 24, 2010.
Final Office Action in U.S. Appl. No. 11/740,844 mailed on Feb. 18, 2011.
Response to Final Office Action dated Feb. 18, 2011 in U.S. Appl. No. 11/740,844, filed Apr. 18, 2011.
Advisory Action in U.S. Appl. No. 11/740,844 mailed on Apr. 27, 2011.
Request for Continued Examination and Amendment filed in U.S. Appl. No. 11/740,844, filed May 18, 2011.
Non-Final Office Action in U.S. Appl. No. 11/740,844 mailed on Jul. 20, 2011.
U.S. Appl. No. 11/840,831, filed Aug. 17, 2007.
Non-Final Office Action in U.S. Appl. No. 11/840,831 mailed on Oct. 12, 2010.
Response to Non-Final Action dated Oct. 12, 2010 in U.S. Appl. No. 11/840,831, filed Feb. 14, 2011.
Final Office Action in U.S. Appl. No. 11/840,831 mailed on May 5, 2011.
Request for Continued Examination and Amendment in U.S. Appl. No. 11/840,831, filed Jul. 5, 2011.
Non-Final Office Action in U.S. Appl. No. 11/840,831 mailed on Jul. 21, 2011.
Non-Final Office Action in U.S. Appl. No. 12/076,163 mailed on Apr. 28, 2011.
Response to Non-Final Office Action dated Apr. 28, 2011 in U.S. Appl. No. 12/076,163, filed Jul. 28, 2011.
Non-Final Office Action in U.S. Appl. No. 12/187,207 mailed on Mar. 25, 2011.
Response to Non-Final Action dated Mar. 25, 2011 in U.S. Appl. No. 12/187,207, filed Jun. 27, 2011.
U.S. Appl. No. 11/850,432, filed Sep. 5, 2007.
U.S. Appl. No. 12/123,370, filed May 19, 2008.
U.S. Appl. No. 12/102,526, filed Apr. 14, 2008.
U.S. Appl. No. 11/210,321, filed Aug. 23, 2005.
Non-Final Office Action in U.S. Appl. No. 11/473,930 mailed on Mar. 1, 2012.
Request for Continued Examination in U.S. Appl. No. 11/840,831, filed Mar. 22, 2012.
U.S. Appl. No. 13/429,363 entitled "System, Method, and Computer Program Product for Preventing Image-Related Data Loss", filed Mar. 24, 2012.
Request for Continued Examination and Amendment in U.S. Appl. No. 11/740,844, filed Apr. 16, 2012.
Request for Continued Examination in U.S. Appl. No. 11/840,831, filed Apr. 27, 2012.
U.S. Appl. No. 13/434,777, filed Mar. 29, 2012, entitled "System, Method, and Computer Program Product for Determining Whether an Electronic Mail Message is Compliant with an Etiquette Policy", Inventor Gopi Krishna Chebiyyam.
Final Office Action in U.S. Appl. No. 11/473,930 mailed on Sep. 14, 2011.
Request for Continued Examination and Amendment in U.S. Appl. No. 11/473,930, filed Nov. 14, 2011.
Response to Non-Final Office Action dated Jul. 20, 2011 in U.S. Appl. No. 11/740,844, filed Oct. 19, 2011.
Response to Non-Final Action dated Jul. 21, 2011 in U.S. Appl. No. 11/840,831, filed Oct. 19, 2011.
Final Office Action in U.S. Appl. No. 11/840,831 mailed on Dec. 21, 2011.
Final Office Action in U.S. Appl. No. 12/076,163 mailed on Oct. 19, 2011.
Request for Continued Examination in U.S. Appl. No. 12/187,207, filed Nov. 11, 2011.
Layland, Robin, "Data Leak Prevention: Coming Soon to a Business Near You," Business Communications Review, May 2007 (pp. 44-49).
Heikkila, Faith M., "Encryption: Security Considerations for Portable Media Devices," IEEE Computer Society, IEEE Security & Privacy, Jul./Aug. 2007 (pp. 22-27).
Response to Non-Final Office Action dated Mar. 1, 2012 in U.S. Appl. No. 11/473,930, filed May 29, 2012.
Final Office Action in U.S. Appl. No. 11/473,930 mailed on Aug. 8, 2012.
Non-Final Office Action in U.S. Appl. No. 11/564,745 mailed on Jan. 19, 2012.
Response to Non-Final Office Action dated Jan. 19, 2012 in U.S. Appl. No. 11/564,745, filed Apr. 16, 2012.
Final Office Action in U.S. Appl. No. 11/564,745 mailed on Jun. 4, 2012.
Request for Continued Examination and Amendment in U.S. Appl. No. 11/564,745, filed Aug. 6, 2012.
Final Office Action in U.S. Appl. No. 11/740,844 mailed on Feb. 16, 2012.
Non-Final Office Action in U.S. Appl. No. 11/740,844 mailed on May 10, 2012.
Response to Non-Final Office Action dated May 10, 2012 in U.S. Appl. No. 11/740,844, filed Jul. 10, 2012.
Final Office Action in U.S. Appl. No. 11/740,844 mailed on Aug. 15, 2012.
Notice of Allowance and Examiner's Statement of Reasons for Allowance in U.S. Appl. No. 11/840,831 mailed on Apr. 3, 2012.
Request for Continued Examination and Response in U.S. Appl. No. 11/840,831, filed Feb. 21, 2012.
Notice of Allowance and Examiner's Statement of Reasons for Allowance in U.S. Appl. No. 11/840,831 mailed on May 9, 2012.
Request for Continued Examination and Amendment in U.S. Appl. No. 12/076,163, filed Jan. 19, 2012.
Non-Final Office Action in U.S. Appl. No. 12/076,163 mailed on Sep. 4, 2012.
Non-Final Office Action in U.S. Appl. No. 13/434,777 mailed on Aug. 20, 2012.
Request for Continued Examination and Amendment to in U.S. Appl. No. 11/473,930, filed Nov. 7, 2012.
Request for Continued Examination and Amendment in U.S. Appl. No. 11/740,844, filed Nov. 15, 2012.
Response to Non-Final Office Action dated Aug. 20, 2012 in U.S. Appl. No. 13/434,777, filed Nov. 20, 2012.

* cited by examiner

METHOD AND SYSTEM FOR POLICY BASED MONITORING AND BLOCKING OF PRINTING ACTIVITIES ON LOCAL AND NETWORK PRINTERS

BACKGROUND OF THE INVENTION

1. Field of the Invention

The present invention relates to a method and system for data loss prevention, and more particularly to a method of protecting sensitive data from being printed in an unauthorized manner.

2. Description of the Related Art

Host based data loss prevention agents are used to prevent unauthorized user activities that result in data leaving the organization in a manner that compromises a set security policy. User activity is monitored within each host by an application software agent. The agent intercepts user activities via software probes that gather information about application requests and provide that information to the agent to determine if the user request should be allowed or blocked. Data loss incidents can be of many forms, such as file copy, email, web posting and printing of sensitive content.

A need arises for a technique by which data loss incidents involving printing can be controlled and prevented.

SUMMARY OF THE INVENTION

The present invention provides a method and system for data loss prevention, and more particularly to a method of protecting sensitive data from being printed in an unauthorized manner. The system includes software agents on host machines that enforce a security policy and determine whether a printing activity should be allowed to execute, monitored or even blocked. The agents examine various criteria to determine if the printing activity is allowed, such as the user identity, type of printer, location of printer, process initiating the printing activity, and the content being printed. The agent uses a dynamic proxy replacement printer driver, for each installed printer, to extract the content of the data being printed, and determine if the printing operation should be allowed.

A method for controlling printing activities implemented in a computer system comprises intercepting a print job comprising print data intended for a printer driver, delaying performance of the print job, analyzing content of the print data to determine whether to allow or cancel the print job based on a security policy, and resuming or canceling the print job based on the analysis of the content of the print data.

The print data comprises representation of characters to be printed and the content of the print data is analyzed by determining whether the representation of characters to be printed is text data or other data, when the representation of characters to be printed is other data, converting the other data to text data, organizing the text data into lines of text, and analyzing the organized text data using the security policy. The other data comprises glyphs and the glyphs are converted to text data by determining whether a mapping from glyph to text data is available, when a mapping from glyph to text data is not available, generating a mapping from glyph to text data using the font of the glyph, and converting the glyphs to text data using the mapping from glyph to text data. The print data further comprises information identifying a location of each character of the text data and the text data is organized into lines of text by extracting the information identifying the location of each character of the text data, and sorting the characters of the text data using the information identifying the location of each character of the text data. The process described is done in collaboration with the printer driver for which the print job was intended.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention provides a method and system for data loss prevention, and more particularly to a method of protecting sensitive data from being printed in an unauthorized manner. The system includes software agents on host machines that enforce a security policy and determine whether a printing activity should be allowed to execute, monitored or even blocked. The agents examine various criteria to determine if the printing activity is allowed, such as the user identity, type of printer, location of printer, process initiating the printing activity, and the content being printed. The agent uses a dynamic proxy replacement printer driver, for each installed printer, to extract the content of the data being printed, and determine if the printing operation should be allowed.

Figure 1:
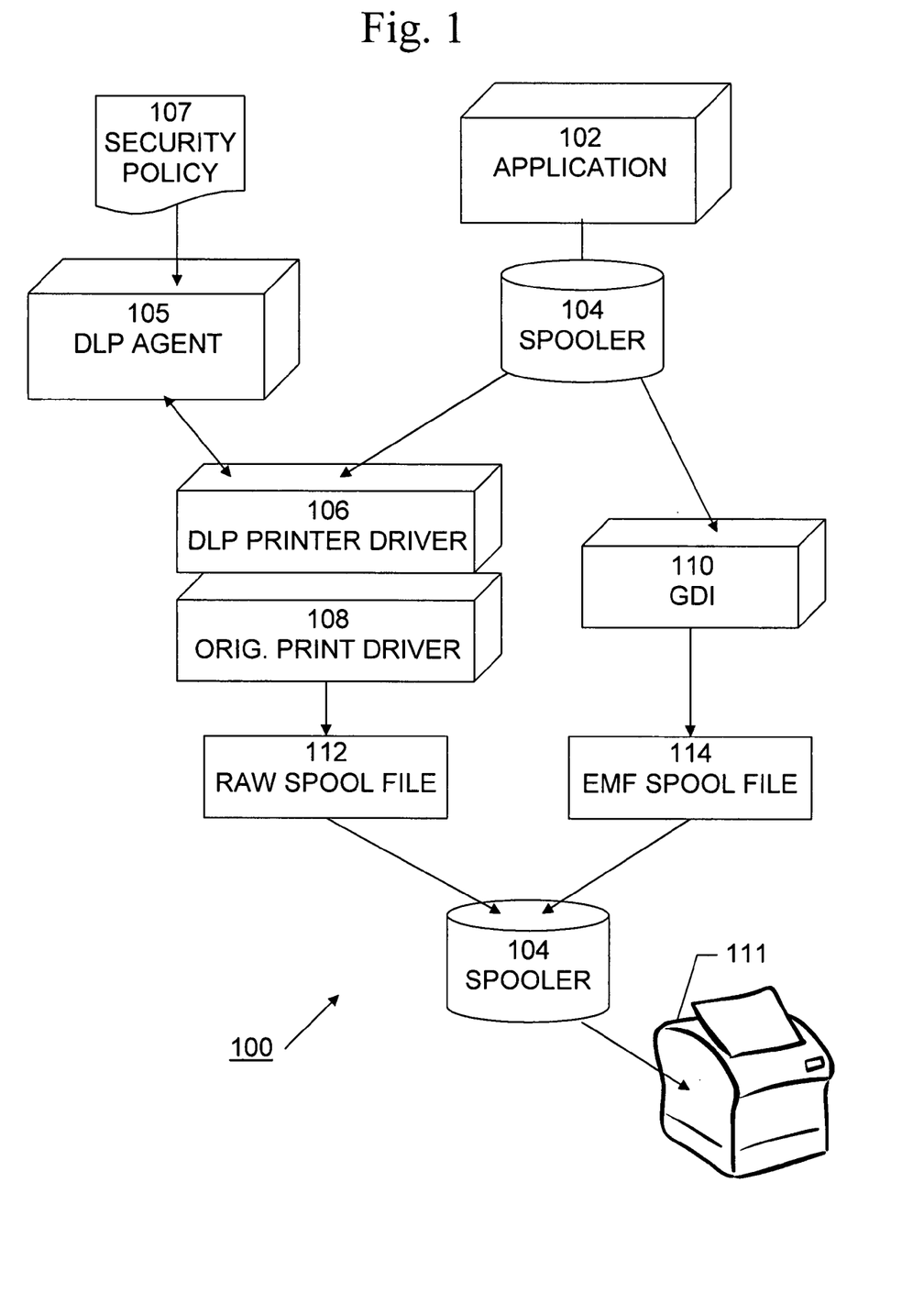
FIG. 1 is an exemplary block diagram of a software environment, such as in a host computer system, in which the present invention may be implemented.

FIG. 1 illustrates a software environment 100, such as in a host computer system, in which the present invention may be implemented. Software environment 100 includes one or more application programs, such as application 102, print spooler 104, Data Loss Prevention (DLP) agent 105, DLP printer driver 106, security policy 107, original printer driver 108, and Graphical Device Interface (GDI) 110. Printer 111 is controlled by software environment 100, typically via spooler 104. Application 102 is a software program that a user controls or manipulates in order to perform tasks that the user wishes to perform. Print spooler 104 accepts print requests from application 102, loads the print requests into a buffer (such as an area on a disk), and transmits the print requests from the buffer to the printer at the rate at which the printer requests them.

DLP agent 105 is software that is installed on all computers in an organization. DLP agent 105, in conjunction with DLP printer driver 106, intercepts all printing requests and allows them to proceed only if they comply with security policy 107. Security policy 107 is the definition of security for software environment 100, may also define security for one or more systems, organizations or other entities associated with software environment 100. For an organization, security policy 107 addresses the constraints on behavior of its members as well as constraints imposed on adversaries by mechanisms such as doors, locks, keys and walls. For systems, security policy 107 addresses constraints on functions and flow among them, constraints on access by external systems and adversaries including programs and access to data by people.

DLP printer driver 106 and original printer driver 108 are software that converts the data to be printed to the form specific to a printer. The purpose of printer drivers is to allow applications, such as application 102 to do printing without being aware of the technical details of each printer model. Original printer driver 108 is the printer driver that was originally installed in the software environment and is typically specific to printer 111. DLP printer driver 106 intercepts data and communication flow between spooler 104 and original printer driver 108 and implements the DLP functions described below. GDI 110 is an interface for representing graphical objects and transmitting them to output devices such as monitors and printers. GDI 110 is responsible for tasks such as drawing lines and curves, rendering fonts and handling palettes. GDI 110 outputs Enhanced MetaFile (EMF) 114, which includes information that may be used by GDI 110 and/or printer 111 to generate images for display or printing.

DLP agent 105 is software that is installed on all computers in an organization. DLP agent 105, in conjunction with DLP printer driver 106, intercepts all printing requests and allows them to proceed only if the comply with a security policy. Interception of printing activities will be performed by the agent whether the target printer is a local printer or a network printer.

DLP agent 105, once installed, installs DLP printer driver 106, which is a dynamic proxy printer driver, to intercept communications and data directed to each original printer driver 108, which is printer specific. Although for clarity, only one DLP printer driver 106, original printer driver 108, and printer 111 are shown in FIG. 1, the present invention contemplates application to any number of installed DLP printer drivers 106, original printer drivers 108, and printers 111.

DLP printer driver 106 processes the information being sent to the printer. It extracts, as described below, the contents of the printing activity as well as information about the application originating the printing activity. This information is passed to DLP agent 105 and based on security policy 107, DLP agent 105 will signal DLP printer driver 106 whether to cancel or to continue the printing activity. If the printing is allowed to continue, DLP printer driver 106 will send the print data to original printer driver 108, otherwise the data will not reach original printer driver 108 and the printing activity will be blocked. Each DLP printer driver 106 is specific to the underlying printer whose driver it replaces, as it needs to mimic the underlying printer's specifics. DLP printer driver 106 prevents data from reaching the original printer driver until DLP agent 105 confirms that the print job is allowed to go through.

Figure 2:
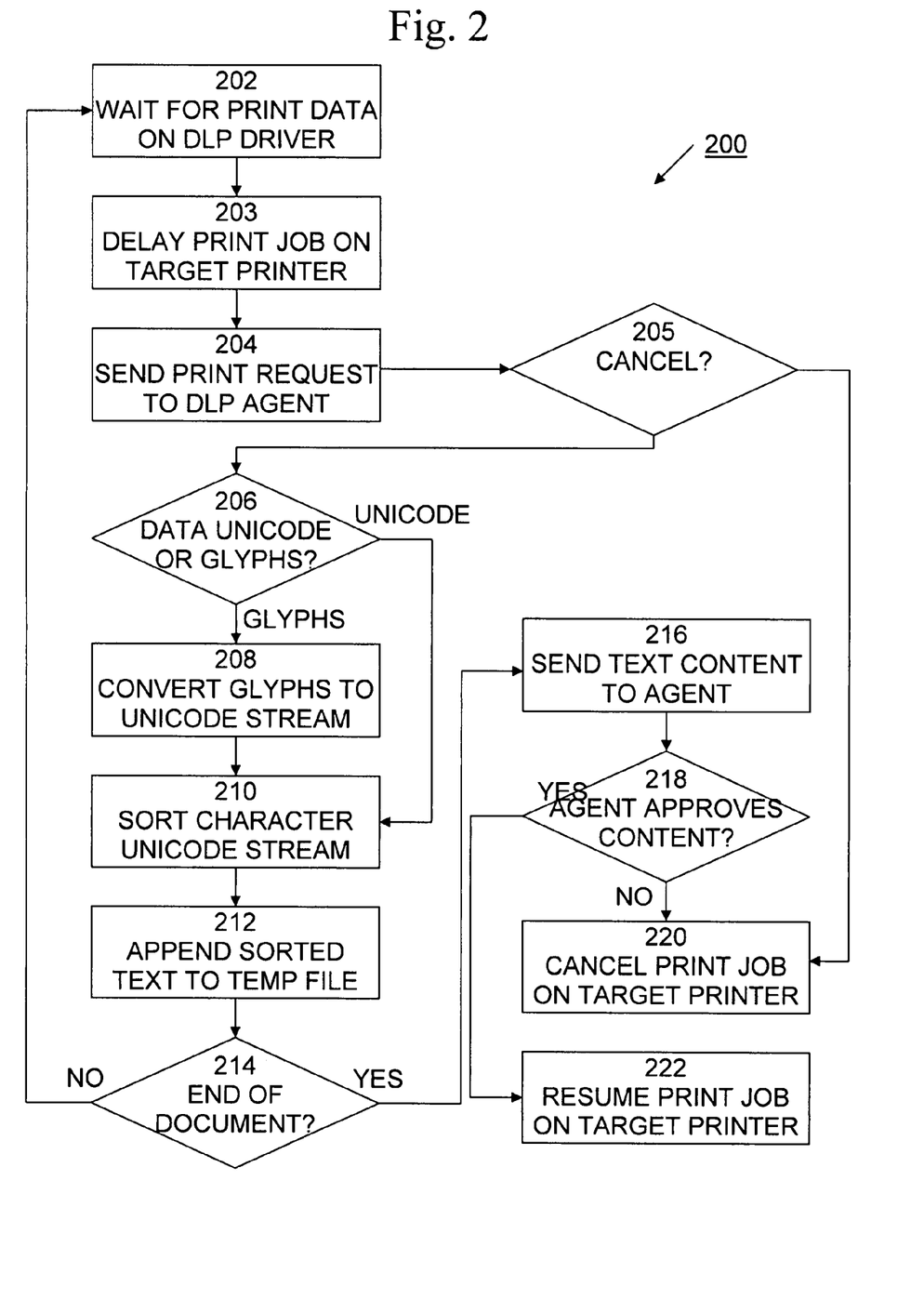
FIG. 2 is an exemplary flow diagram of a process of operation of a DLP agent and a DLP printer driver.

A flow diagram of a process 200 of operation of DLP agent 105 and DLP printer driver 106 is shown in FIG. 2. It is best viewed in conjunction with FIG. 1. Process 200 begins with step 202, in which DLP printer driver 106 waits for print data to be transmitted to it. Once an application begins a print job, print data is sent to DLP printer driver 106. The print data sent to DLP printer driver 106 in step 202, shown in FIG. 2, includes the a text stream, in the form of Unicode text or glyphs, and information identifying the location of the text on the printed page. Typically, the location of each character on the printed page is included with the print data. The location of each character is identified using an X,Y coordinate system.

Unicode is an industry standard allowing computers to consistently represent and manipulate text expressed in any of the world's writing systems. Unicode consists of a repertoire of about 100,000 characters, a set of code charts for visual reference, an encoding methodology and set of standard character encodings, an enumeration of character properties such as upper and lower case, a set of reference data computer files, and a number of related items, such as character properties, rules for text normalization, decomposition, collation, rendering and bidirectional display order (for the correct display of text containing both right-to-left scripts, such as Arabic or Hebrew, and left-to-right scripts). Unicode is used in this document as an example of a text representation system. However, the present invention is not limited to Unicode, but rather, contemplates application to any text representation system.

In step 203, DLP printer driver 106 intercepts the print data and delays the print job from printing on the target printer until process 200 has completed. In step 204, DLP printer driver 106 sends the print request including the print data to DLP agent 105. In step 205, DLP agent 105 determines whether the print data should be canceled by examining non content criteria such as the application, user identity, etc. If the agent determines that the print job is to be canceled, there is no need to do the text extraction at all and the process continues with step 220, in which the print job is canceled. The settings of the DLP printer driver will ensure that applications send data to printers using raw format 112 because the print data content will not be available if the operating system is responsible for rendering the printing job, such as using GDI 110 and EMF spool file 114. Some operating systems convert all print jobs to raw format using the specific printer driver for the target printer, so in essence, the operating system is forced to access the printer driver with all the plain-text from the original document.

If, in step 205, it is determined that the print job is not to be canceled, then the process continues with step 206, in which DLP agent 105 determines whether the print data includes text, such as Unicode text, or glyphs, which are representations of the actual shape of a character image. Application 102 can send textual information to the printer driver as Unicode stream or a glyph stream. If the application is printing text in fonts which are mapped to glyphs in the printer driver, the textual content may not be available to the printer driver. In this case, DLP printer driver 106 needs to translate the glyphs back to Unicode text. Therefore, the process will continue with step 208, in which DLP printer driver 106 will extract a Unicode text stream by converting from the font and glyphs that are sent to the printer driver. The process maps the glyphs back to the textual characters they represent. This reverse mapping is created using the font mapping table and is used to map from glyph codes back to Unicode character code. This allows DLP agent 105 to monitor and block documents written in languages other than English or any other applications that use the Glyphs format.

After the glyphs are converted to Unicode text in step 208, or if, in step 206, it is determined that the print data is already Unicode text, then the process continues with step 210, in which the Unicode character stream is sorted. DLP printer driver 106 may receive the text as glyphs and the text can be received by the driver in a different order than that printed on the document. Thus, DLP printer driver 106 needs to remap the coordinates of the printed text in order to reconstruct the correct textual content being printed. Different printing engines in applications, can send data to the printer driver in different order from which it is seen in the application or on paper. Each string being sent to the printer driver is sent with information on the location of that string on the paper/screen. This information is in the form of bi-dimensional coordinates for each character/glyph. The printer driver sorts the characters by their coordinates and reconstructs the string stream being printed.

In step 212, as the Unicode text stream is sorted, the sorted result is stored in a temporary file for later use. In step 214, it is determined whether the end of the document to be printed has been reached. If not, the process loops back to step 202, in order to wait for more print data. If the end of the document has been reached, then the process continues with step 216, in which the text content is sent to DLP agent 105 for analysis. In step 218, DLP agent 105 performs the content analysis, and determines whether or not the text content is approved, based on security policy 107 and optionally on other parameters. If the content is not approved, then the process continues with step 220, in which the print job is canceled on the target printer 111. If the content is approved, then the process continues with step 222, in which the print job is resumed on the target printer 111.

Figure 3:
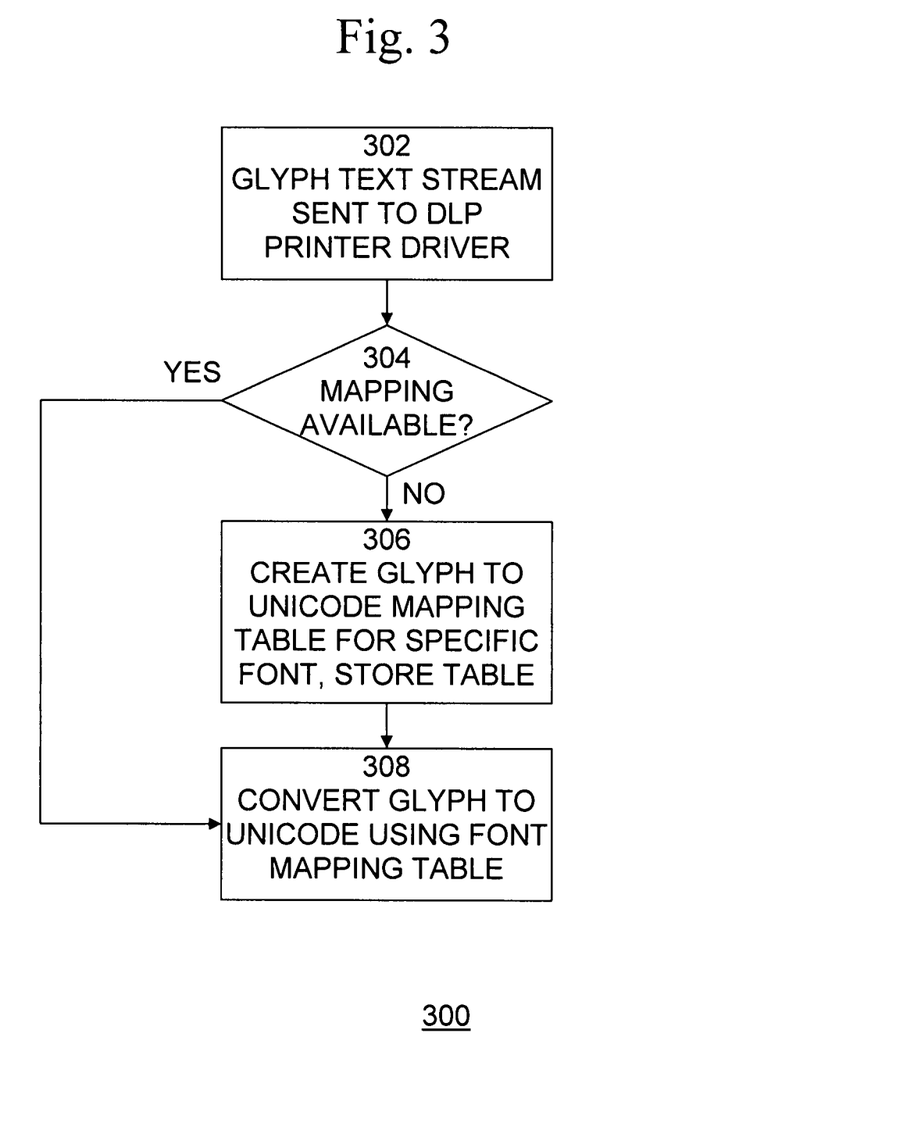
FIG. 3 is an exemplary flow diagram of a process of converting glyphs to Unicode text.

A process 300 of converting glyphs to Unicode text is shown in FIG. 3. It is best viewed in conjunction with FIG. 1. Process 300 begins with step 302, in which a text stream in the form of glyphs is sent to DLP printer driver 106. Each glyph is a representation of an image of a character. Such a representation may include raster (image) data, vector data, spline data, etc. In order to generate text in the form of glyphs, a mapping is performed in which the character ID and the font ID are mapped to the glyph. In order to extract Unicode text from the input glyph text stream, the inverse mapping is performed.

Thus, in step 304, it is determined whether a mapping table that may be used to perform the inverse mapping is available. If not, then the process continues with step 306, in which a glyph to Unicode mapping table is created and stored for each specific font being used. Once the glyph to Unicode mapping table is created, or if, in step 304, glyph to Unicode mapping table is available, the process continues with step 308, in which the glyph text stream is converted to Unicode text using the glyph to Unicode mapping table.

Figure 4:
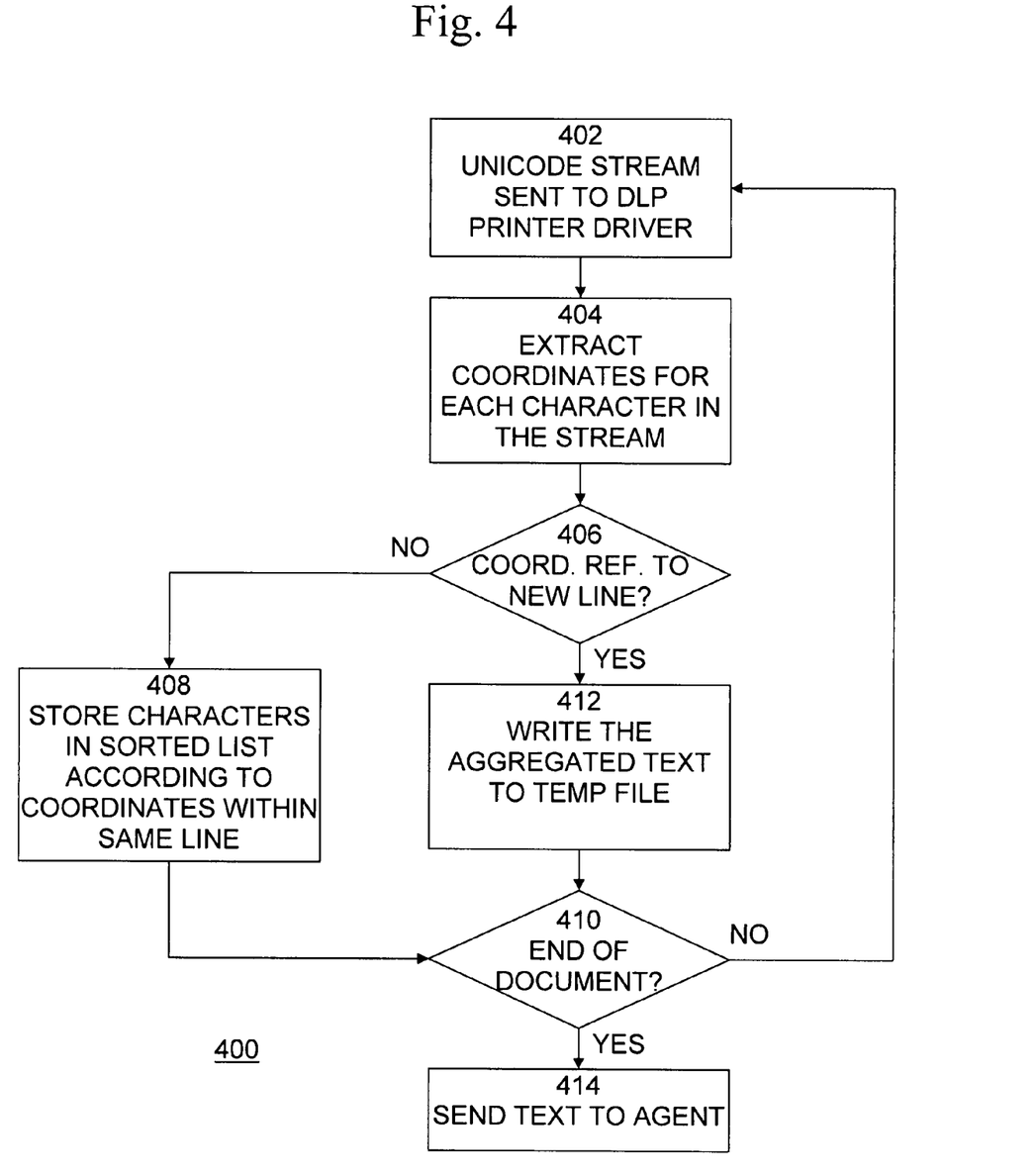
FIG. 4 is an exemplary flow diagram of spatial sorting of characters of a Unicode text stream.

A process of spatial sorting of the characters of the Unicode text stream is shown in FIG. 4. It is best viewed in conjunction with FIG. 1. Process 400 begins with step 402, in which the Unicode text stream is sent to DLP printer driver 106. The print data sent to DLP printer driver 106 in step 202, shown in FIG. 2, includes the a text stream, in the form of Unicode text or glyphs, and information identifying the location of the text on the printed page. Typically, the location of each character on the printed page is included with the print data. The location of each character is identified using an X,Y coordinate system. The X,Y coordinates for each character is also included with the Unicode text stream set to DLP printer driver 106.

In step 404, the X,Y coordinates for each character in the Unicode text stream are extracted from the location information. In step 406, it is determined whether the X,Y coordinates refer to a new line. If not, then the process continues with step 408, in which the characters in the current line are sorted according to their coordinates within the line and stored. The process then continues with step 410. If, in step 406, it was determined that the X,Y coordinates refer to a new line, then the process continues with step 412, in which the aggregated text, including the line just completed, is stored to a temporary file.

From step 408 or step 412, the process then continues with step 410, in which it is determined whether the end of the document has been reached. If not, then the process loops back to step 402, in which additional Unicode text data is received. If the end of the document has been reached, then the process continues with step 414, in which the document text, now stored in the temporary file, is sent to DLP agent 105 for content analysis.

Figure 5:
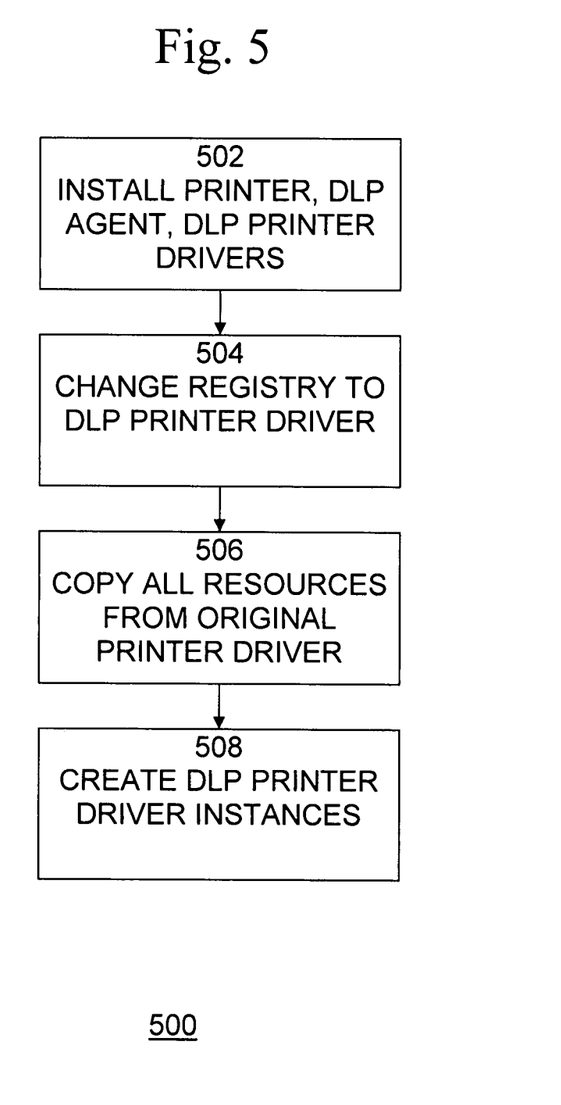
FIG. 5 is an exemplary flow diagram of a process of installing software that may implement the present invention.

A process 500 of installing the software to implement the above-described processes is shown in FIG. 5. It is best viewed in conjunction with FIG. 1. Process 500 is executed upon installation of the DLP Agent for all installed printers, or after the DLP agent is installed, is executed upon installation of a new printer. The DLP Agent is responsible for initiating this process by recognizing a new printer was installed. Process 500 begins with step 502, in which a printer 111 and its corresponding original printer driver 108, DLP agent 105, and DLP printer driver 106 are installed. In step 504, the system registry is modified to register DLP printer driver 106 as a dynamic replacement driver for original printer driver 108. The proxy driver settings force the operating system to send print jobs intended for printer 111 in raw format 112, rather than in EMF format 114. In step 506, all resources from original printer driver 108 are copied for use by DLP printer driver 106. This is necessary because each printer may have different mappings and may have different required resources. Copying all resources from original printer driver 108 ensures that they are available for use by DLP printer driver 106. In step 508, DLP printer driver instances are created for each printer.

Figure 6:
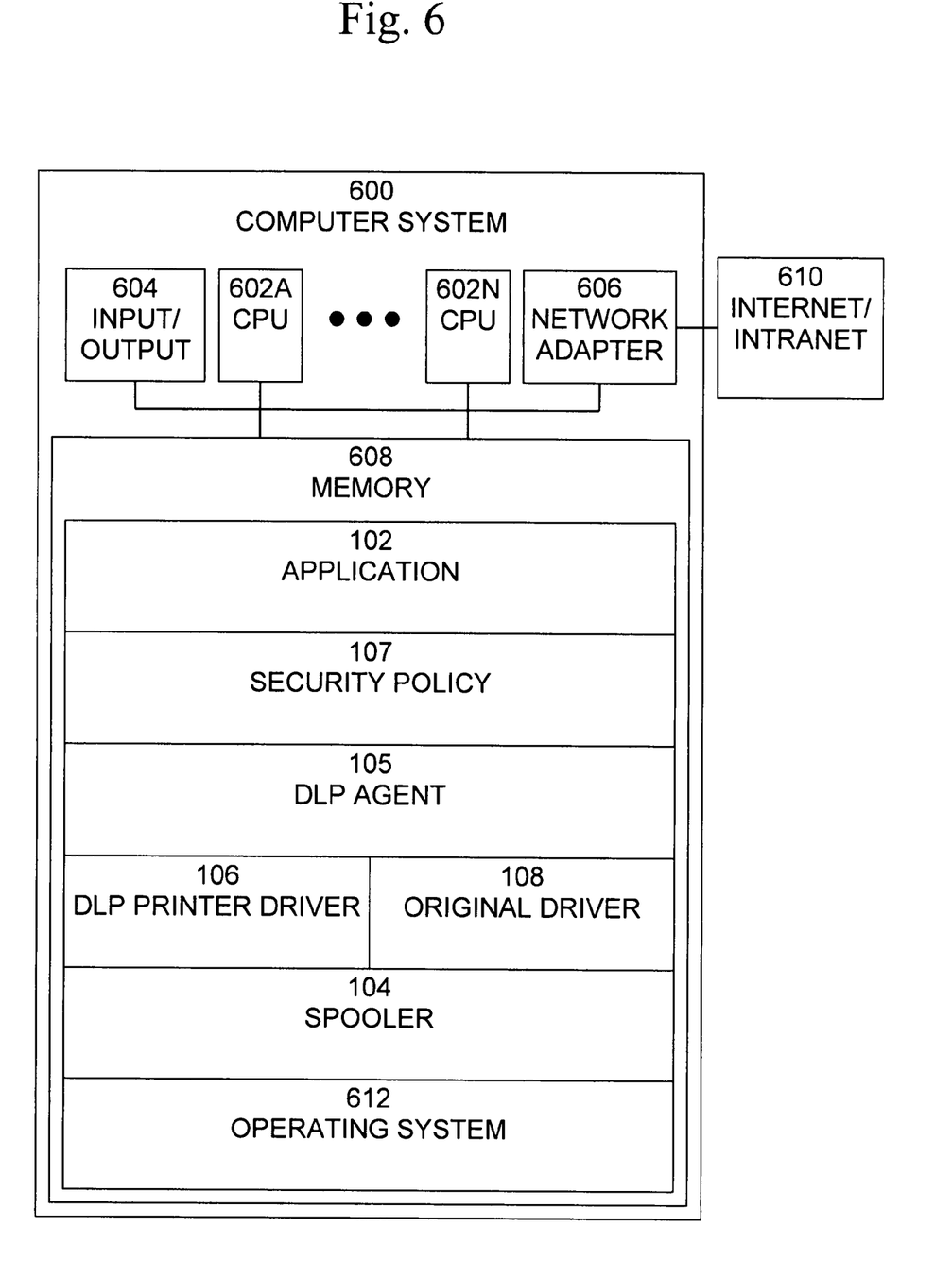
FIG. 6 is an exemplary block diagram of a computer system, in which the present invention may be implemented.

An exemplary block diagram of a computer system 600, in which the present invention may be implemented, is shown in FIG. 6. Computer system 600 is typically a programmed general-purpose computer system, such as a personal computer, workstation, server system, and minicomputer or mainframe computer. Computer system 600 includes one or more processors (CPUs) 602A-602N, input/output circuitry 640, network adapter 606, and memory 608. CPUs 602A-602N execute program instructions in order to carry out the functions of the present invention. Typically, CPUs 602A-602N are one or more microprocessors, such as an INTEL PENTIUM® processor. FIG. 6 illustrates an embodiment in which computer system 600 is implemented as a single multi-processor computer system, in which multiple processors 602A-602N share system resources, such as memory 608, input/output circuitry 604, and network adapter 606. However, the present invention also contemplates embodiments in which computer system 600 is implemented as a plurality of networked computer systems, which may be single-processor computer systems, multi-processor computer systems, or a mix thereof.

Input/output circuitry 604 provides the capability to input data to, or output data from, computer system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 606 interfaces computer system 600 with Internet/intranet 610. Internet/intranet 610 may include one or more standard local area network (LAN) or wide area network (WAN), such as Ethernet, Token Ring, the Internet, or a private or proprietary LAN/WAN.

Memory 608 stores program instructions that are executed by, and data that are used and processed by, CPUs 602A-N to perform the functions of computer system 600. Memory 604 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 608 varies depending upon the function that computer system 600 is programmed to perform. In the example shown in FIG. 6, memory 608 includes application 102, security policy 107, DLP agent 105, DLP printer driver 106, original printer driver 108, spooler 104, and operating system 612. Application 102 is a software program that a user controls or manipulates in order to perform tasks that the user wishes to perform. Print spooler 104 accepts print requests from application 102, loads the print requests into a buffer (such as an area on a disk), and transmits the print requests from the buffer to the printer at the rate at which the printer requests them. DLP agent 105 is software that is installed on all computers in an organization. DLP agent 105, in conjunction with DLP printer driver 106, intercepts all printing requests and allows them to proceed only if they comply with security policy 107. Security policy 107 is the definition of security for computer system 600. DLP printer driver 106 and original printer driver 108 are software that converts the data to be printed to the form specific to a printer. Original printer driver 108 is the printer driver that was originally installed in the software environment and is typically specific to printer 111. DLP printer driver 106 intercepts data and communication flow between spooler 104 and original printer driver 108 and implements the DLP functions described above. Operating system 612 provides overall system functionality.

As shown in FIG. 6, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include storage media, examples of which include, but are not limited to, floppy disks, hard disk drives, CD-ROMs, DVD-ROMs, RAM, and, flash memory, as well as transmission media, examples of which include, but are not limited to, digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
intercepting a print job, which is intended for a first printer driver, at a second printer driver, which interfaces with a data loss prevention agent;
identifying a user identity and an originating application associated with the print job;
analyzing content of print data to determine whether to allow or cancel the print job based on a security policy, wherein the security policy outlines which types of content are authorized for printing across a plurality of computer systems by certain members of an organization, and wherein the security policy outlines which types of content are prohibited from being printed by external systems outside the organization;
wherein the second printer driver prevents all data from reaching the first printer driver until the data loss prevention agent confirms that the print job is allowed; and
wherein if the print job is allowed, the second printer driver will send the print data to the first printer driver for printing.

2. The method of claim 1, wherein the print data comprises a representation of characters to be printed and the content of the print data is analyzed by:
determining whether the representation of characters to be printed is text data or other data;
when the representation of characters to be printed is other data, converting the other data to text data;
organizing the text data into lines of text; and
analyzing the organized text data using the security policy.

3. The method of claim 2, wherein the other data comprises glyphs and the glyphs are converted to text data by:
determining whether a mapping from glyph to text data is available;
when a mapping from glyph to text data is not available, generating a mapping from glyph to text data using a font of the glyphs; and
converting the glyphs to text data using the mapping from glyph to text data.

4. The method of claim 2, wherein the print data further comprises information identifying a location of each character of the text data and the text data is organized into lines of text by:
extracting the information identifying the location of each character of the text data; and
sorting the characters of the text data using the information identifying the location of each character of the text data.

5. The method of claim 1, wherein the content of the print data is analyzed using resources copied from the first printer driver for which the print job was intended.

6. A system comprising:
a processor; and
a memory operable to store computer program instructions executable by the processor such that the system is configured for:
intercepting a print job, which is intended for a first printer driver, at a second printer driver, which interfaces with a data loss prevention agent;
identifying a user identity and an originating application associated with the print job;
analyzing content of print data to determine whether to allow or cancel the print job based on a security policy, wherein the security policy outlines which types of content are authorized for printing across a plurality of computer systems by certain members of an organization, and wherein the security policy outlines which types of content are prohibited from being printed by external systems outside the organization;
wherein the second printer driver prevents all data from reaching the first printer driver until the data loss prevention agent confirms that the print job is allowed; and
wherein if the print job is allowed, the second printer driver will send the print data to the first printer driver for printing.

7. The system of claim 6, wherein the print data comprises a representation of characters to be printed and the content of the print data is analyzed by:
determining whether the representation of characters to be printed is text data or other data;
when the representation of characters to be printed is other data, converting the other data to text data;
organizing the text data into lines of text; and
analyzing the organized text data using the security policy.

8. The system of claim 7, wherein the other data comprises glyphs and the glyphs are converted to text data by:
determining whether a mapping from glyph to text data is available;
when a mapping from glyph to text data is not available, generating a mapping from glyph to text data; and
converting the glyphs to text data using the mapping from glyph to text data.

9. The system of claim 7, wherein the print data further comprises information identifying a location of each character of the text data and the text data is organized into lines of text by:
extracting the information identifying the location of each character of the text data; and
sorting the characters of the text data using the information identifying the location of each character of the text data.

10. The system of claim 6, wherein the content of the print data is analyzed using resources copied from the first printer driver for which the print job was intended, the resources copied when the data loss prevention agent is installed in the computer system.

11. The system of claim 6, wherein the second printer driver is installed in the computer system as a dynamic replacement driver for the intended first printer driver.

12. A computer program product including a non-transitory computer medium and computer instructions for performing operations, comprising:
intercepting a print job, which is intended for a first printer driver, at a second printer driver, which interfaces with a data loss prevention agent;
identifying a user identity and an originating application associated with the print job;
analyzing content of print data to determine whether to allow or cancel the print job based on a security policy, wherein the security policy outlines which types of content are authorized for printing across a plurality of computer systems by certain members of an organization, and wherein the security policy outlines which types of content are prohibited from being printed by external systems outside the organization;
wherein the second printer driver prevents all data from reaching the first printer driver until the data loss prevention agent confirms that the print job is allowed; and
wherein if the print job is allowed, the second printer driver will send the print data to the first printer driver for printing.

13. The computer program product of claim 12, wherein the print data comprises a representation of characters to be printed and the content of the print data is analyzed by:
determining whether the representation of characters to be printed is text data or other data;
when the representation of characters to be printed is other data, converting the other data to text data;
organizing the text data into lines of text; and
analyzing the organized text data using the security policy.

14. The computer program product of claim 13, wherein the other data comprises glyphs and the glyphs are converted to text data by:
determining whether a mapping from glyph to text data is available;
when a mapping from glyph to text data is not available, generating a mapping from glyph to text data; and
converting the glyphs to text data using the mapping from glyph to text data.

15. The computer program product of claim 13, wherein the print data further comprises information identifying a location of each character of the text data and the text data is organized into lines of text by:
extracting the information identifying the location of each character of the text data; and
sorting the characters of the text data using the information identifying the location of each character of the text data.

16. The computer program product of claim 12, wherein the content of the print data is analyzed using resources copied from the first printer driver for which the print job was intended.

* * * * *